United States Patent [19]

Yasuda

[11] Patent Number: 5,487,790

[45] Date of Patent: Jan. 30, 1996

[54] ELECTRIC POWER GENERATING ELEMENT

[76] Inventor: Shigeyuki Yasuda, c/o Tomonokai Research Laboratory 2-227, Kibuki-cho-kita, Kasugai-shi, Aichi-ken, Japan

[21] Appl. No.: 981,217

[22] Filed: Nov. 25, 1992

[30] Foreign Application Priority Data

| Nov. 25, 1991 | [JP] | Japan | 3-336326 |
| Mar. 9, 1992 | [JP] | Japan | 4-050655 |
| Jul. 28, 1992 | [JP] | Japan | 4-201281 |

[51] Int. Cl.[6] ............................................. H01L 37/00
[52] U.S. Cl. .................... 136/200; 136/205; 136/236.1; 310/306; 322/2 R; 429/41; 429/42; 429/51; 429/112; 429/192
[58] Field of Search ........................... 136/200, 205, 136/236.1; 310/306; 322/2 R; 429/11, 33, 41, 42, 46, 112, 192, 193, 212, 213, 217, 51

[56] References Cited

U.S. PATENT DOCUMENTS

| 2,824,165 | 2/1958 | Marsal | 136/122 |
| 3,844,843 | 10/1974 | Kay et al. | 136/206 |
| 4,211,828 | 7/1980 | Peck | 429/11 |
| 4,294,893 | 10/1981 | Iemmi et al. | 429/42 |
| 4,320,184 | 3/1982 | Bernstein et al. | 429/217 |
| 4,693,947 | 9/1987 | Weintraub et al. | 429/51 |
| 4,758,473 | 7/1988 | Herscovici et al. | 428/408 |
| 4,783,381 | 11/1988 | Tytgat et al. | 429/15 |
| 4,816,359 | 3/1989 | Nagele et al. | 429/213 |
| 4,851,308 | 7/1989 | Akhtar | 429/192 |
| 4,865,932 | 9/1989 | Masuda et al. | 429/194 |
| 4,908,283 | 3/1990 | Takahashi et al. | 429/192 |
| 4,925,752 | 5/1990 | Fauteux et al. | 429/191 |
| 5,030,527 | 7/1991 | Carpio et al. | 429/192 |
| 5,066,556 | 11/1991 | Toyosawa et al. | 429/194 |
| 5,225,296 | 7/1993 | Ohsawa et al. | 429/218 |

FOREIGN PATENT DOCUMENTS

| 0191484 | 8/1986 | European Pat. Off. . |
| 3-10203 | 2/1991 | Japan . |

*Primary Examiner*—Donald P. Walsh
*Assistant Examiner*—Chrisman D. Carroll
*Attorney, Agent, or Firm*—Foley & Lardner

[57] ABSTRACT

In an electric power generating element, either positive or negative electrode includes a composition containing an organic compound as a main agent and the positive electrode has an electrically conductive substance so that relatively low-temperature thermal energy is efficiently converted to electric energy. Polyethylene glycol is employed as the organic compound and graphite or a graphite composition is employed as the conductive substance. Salt providing ionic conductivity may be added to the organic compound or polyethylene glycol, and the negative electrode may be formed of a metal having an ionization tendency as large as or larger than copper or a composition of the metal.

7 Claims, 15 Drawing Sheets

ELECTRIC POWER GENERATING ELEMENT

BACKGROUND OF THE INVENTION

1. Field of the Invention

This invention relates to an electric power generating element capable of efficiently converting a low-temperature heat energy to an electric energy.

2. Description of the Prior Art

Demands for diversification of energy resources, global environment protection and so on have proposed applications of thermoelectric generation of electricity employing a thermoelectric generating element by use of the Seebeck effect to a small-scale power generation. For example, a fossil fuel such as propane is burned by means of a burner and then, a heat source with a capacity up to 820 K obtained from the burning of the fossil fuel is applied to a thermoelectric generating element composed of the system of PbTe so that thermo-electromotive force is generated by the Seebeck effect. In another proposed method, the fossil fuel is gradually burned in the presence of a platinum catalyst such that a heat source with a capacity up to 600 K is obtained. The heat source is applied to a thermoelectric generating element composed of the system of BiTe. In further another proposed method, a nuclear reactor or radioactive elements are used as the heat source to apply heat to a thermoelectric generating element composed of the system of SiGe when the supply of the fossil fuel is difficult.

However, a high-temperature heat source is required in the above-described conventional methods of the thermoelectric generation of electricity, resulting in a low efficiency of thermoelectric conversion. Further, the fossil fuel, the nuclear reactor or the radioactive element is required to obtain the high-temperature heat source and accordingly, a large-scale apparatus for the thermoelectric generation is necessitated. Thus, the conventionally proposed methods of thermoelectric generation are contrary to demands for compactness and cost effectiveness. Further, the running cost would become high and a sufficient energy saving effect would not be expected.

The prior art also provides as another related art a solar battery wherein solar energy is converted to electric energy by the photovoltaic effect. The solar battery is expensive and cannot be used when the sunlight is not available. Further, the solar battery has a critical defect that the heat energy other than light energy cannot be converted to the electric energy. Additionally, the solar battery requires a large space for receiving the sunlight, which is contrary to the demands for compactness and cost effectiveness.

SUMMARY OF THE INVENTION

Therefore, an object of the present invention is to provide an electric power generating element wherein low-temperature heat energy such as exhaust heat can be used as a heat source and the low-temperature heat energy can be efficiently converted to the electric energy so that an economic power generation can be provided, sufficient energy saving can be achieved and the element can contribute to the global environment protection, and wherein the compactness and cost effectiveness of the element can also be achieved.

The inventor of the present invention has been engaging in the study of the system of polyethylene glycol-graphite serving as a positive self-temperature control plane heating element, and has been granted a Japanese patent No. 1,647,696 (Japanese Published Patent Application No. 3-10203). The polyethylene glycol-graphite system will be referred to as "PG-GC system" hereafter. Subsequently, the inventor succeeded in explicating the switching and the relationship between current and voltage in the PG-GC system on the assumption of occurrence of the electron transfer from the graphite to the polyethylene glycol in the process of elucidating an electrically conducting mechanism of the PG-GC system. Consequently, the inventor had a conception that the PG-GC system would function as an electric power generating element. After experiments, the inventor made an invention of an electric power generation element generating an electromotive force and a short-circuit current whose values were larger than expected.

The present invention provides an electric power generating element converting a low-temperature heat energy to an electric energy, comprising a positive electrode containing graphite a negative electrode formed from a metal, and at least polyethylene glycol which can exist as a solid or liquid. At least one of the electrodes contacting the at least one glycolic organic substance. The electron transfer from the graphite to the polyethylene glycol can be conceived as a reaction at the side of the positive electrode in the electric power generating element:

$$GC+PG \rightarrow GC^{+}+PG \ (et^{-})$$

where PG is polyethylene glycol and GC is graphite. The experimental results show the movement of electric charges to the polyethylene glycol though this reaction has not conventionally been known in the art.

As to the reaction at the side of the negative electrode, copper ions were recognized to be in a solution of lithium chloride-polyethylene glycol as the result of an inductively coupled plasma emission spectrometry. In this case, lithium chloride was employed for providing the ionic conductivity. Consequently, copper leaves the electrons in the electrode at the negative electrode side, dissolving out as positive ions into polyethylene glycol:

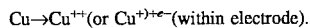
$$Cu \rightarrow Cu^{++}(or\ Cu^{+})+e^{-}(within\ electrode).$$

It is considered that in this reaction, an external current flows since the electrons left in the copper electrode flows through an external circuit, reaching the positive electrode to transfer into polyethylene glycol. It has not conventionally been considered that copper dissolves out into polyethylene glycol. In the present invention, the reason for the solution of copper into polyethylene glycol would be that copper would be stable when it is coordinated as ions with polyethylene glycol or that copper could dissolve out easily by the effect of potential induced by transfer of electrons at the positive electrode.

At first, the inventor considered that products of thermal decomposition of polyethylene glycol, for example, carbonyl such as aldehyde or ketone, acidifies the copper electrode such that the copper ions dissolve out. However, as will be described in a first embodiment of the present invention later, polyethylene glycol after discharge was measured by way of the infrared spectroscopic analysis and the result was compared with that of unused polyethylene glycol. Consequently, no difference was found between the spectrum of polyethylene glycol after discharge and that of the unused polyethylene glycol, and no products of the thermal decomposition such as aldehyde or ketone could be found.

Also as will be described in the first embodiment, lithium chloride, sodium chloride and potassium chloride were added to polyethylene glycol respectively so that these solutions take an approximately equal molar concentration. Then, when electromotive forces and short-circuit currents in these solutions were compared with one another, almost no difference could be seen among the electromotive forces and short-circuit currents in the three salt systems. Consequently, it can be considered that the salt plays only a part to increase the conductivity of the system. Accordingly, any kind of salt can be employed regardless of an organic and inorganic acid salt, only if it can provide the conductivity. However, any kind of salt with a larger solubility is preferable.

In consideration of the facts as far as described above, the electric power generating element of the present invention basically comprises an organic compound (polyethylene glycol) and an electrically conductive substance (graphite). Any kind of salt may be employed as an electrolyte only if it can provide the system with the conductivity. A positive electrode includes a conductive material which is graphite or a composition of graphite and a negative electrode is formed of a metal having an ionization tendency same as or larger than copper or a composition of the metal.

Furthermore, when a separator is interposed between the positive and negative electrodes, contact between the electrodes can be prevented by the separator in case that the electric power generating element is thinned.

When an activator such as manganese dioxide is added to the composition at the side of the positive electrode, electrode reaction can be efficiently performed.

When the negative electrode is formed of a metal having a high ionization tendency, the electromotive force can be efficiently increased.

Furthermore, when two sheets of a nonwoven fabric are impregnated with the compositions of the electrodes respectively, the thickness of the electric power generating element can be reduced and the short-circuit current can be increased with reduction of the inner resistance. Additionally, when the nonwoven fabric is formed of a synthetic resin such as a polyester resin, each composition does not permeate the nonwoven fabric. Consequently, the density of the components of each composition can be prevented from being varied because of the permeation.

Other objects of the present invention will become obvious upon understanding of the illustrated embodiments about to be described. Various advantages not referred to herein will occur to those skilled in the art upon employment of the invention in practice.

BRIEF DESCRIPTION OF THE DRAWINGS

Several embodiments of the present invention will be described with reference to the accompanying drawings in which.

DESCRIPTION OF THE PREFERRED EMBODIMENTS

Figure 1:
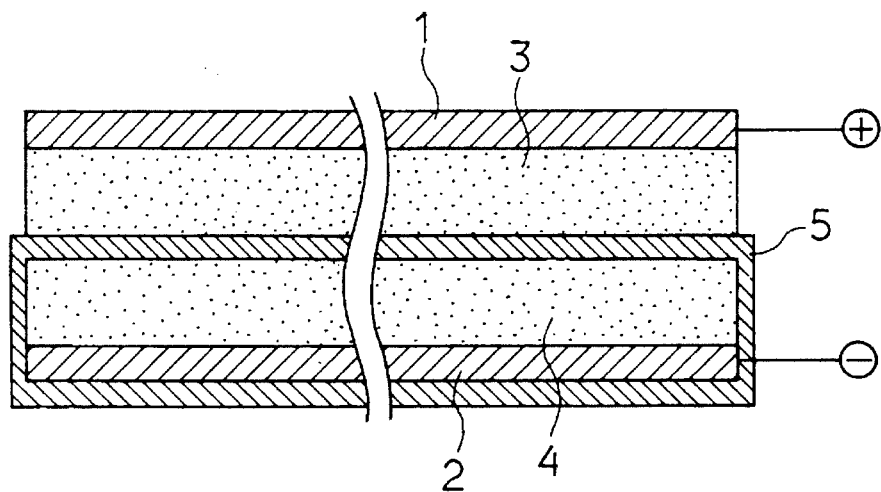
FIG. 1 is a sectional view of the electric power generating element of a first embodiment of the present invention.

First Embodiment (1) Referring to FIG. 1, a positive electrode 1 and a negative electrode 2 of the electric power generating element of the first embodiment are each formed from a copper foil. A first or positive-electrode composition 3 is formed by heating 40 weight percentage of graphite ("#90—300M", Nishimura Graphite) and 60 weight percentage of polyethylene glycol (Daiichi Kogyo Seiyaku Co., Ltd.) so that they are melted and subsequently by impregnating a nonwoven fabric of polyester resin with the melted material. The positive-electrode composition 3 is brought into close contact with the positive electrode 1 in its melted state to be thereby secured to it.

A second or negative-electrode composition 4 is composed of 30 weight percentage of lithium chloride ("Special-grade Reagent", Nakaraitesuku) and 70 weight percentage of polyethylene glycol. One side of the negative-electrode composition 4 is secured to the negative electrode 2 in the same manner as-in the positive-electrode composition 3 and a sheet of kraft paper serving as a separator 5 is bonded to the opposite side of the negative-electrode composition 4 such that the whole composition 4 is covered by the separator 5. The negative-electrode composition 4 covered by the separator 5 is pressed against the positive-electrode composition 3 and the whole power generating element is enclosed in a package (not shown) formed from a polyester film. The electric power generating element composed as described above has the width of 10 mm, the length of 65 mm and the thickness of about 1 mm.

Figure 2:
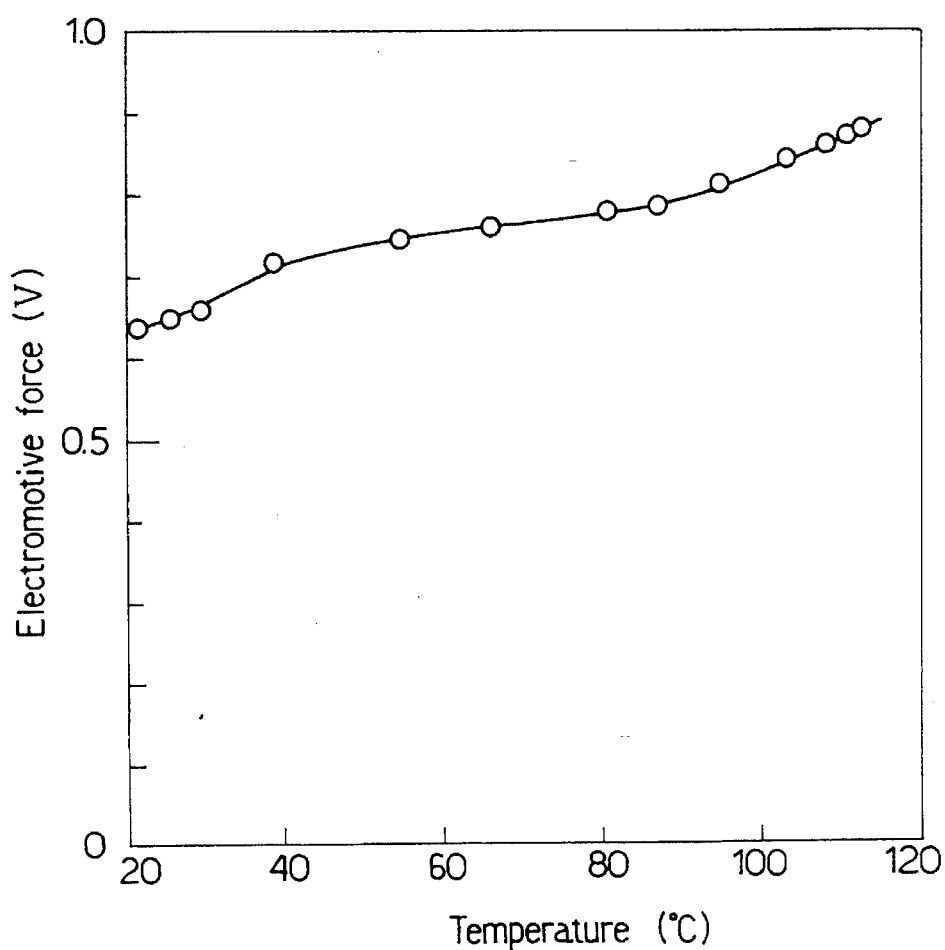
FIG. 2 is a graph showing the relationship between the electromotive force of the element and the temperature.
Figure 3:
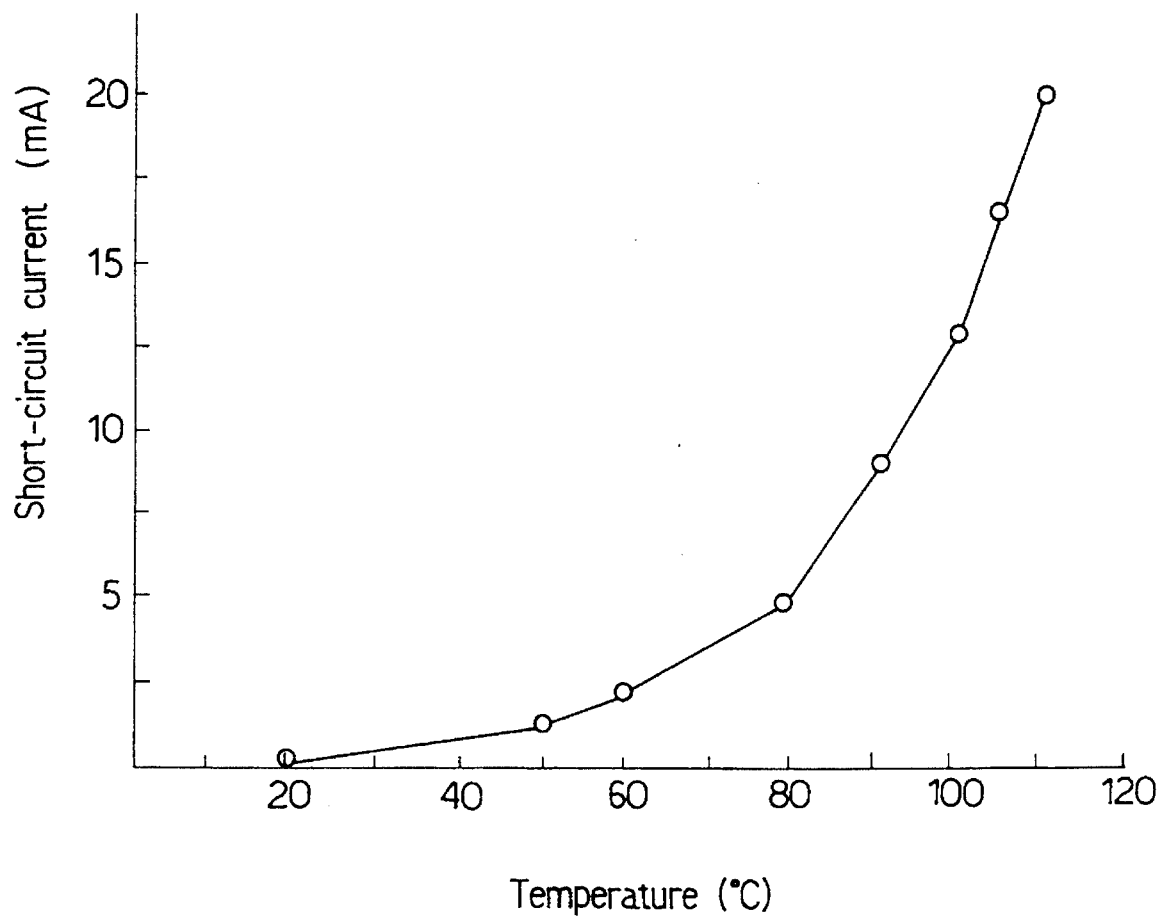
FIG. 3 is a graph showing the relationship between the short-circuit current between the electrodes and the temperature.

FIG. 2 shows the relationship between an electromotive force and the temperature when the above-described power generating element is heated by means of a hot plate at the rate of about 0.45 deg/minute. In this case, a digital multimeter (Takeda TR 6841 and TR 6848) is used for measurement of voltage and current and a digital thermometer (Takara D 611) is used for measurement of the temperature. As obvious from FIG. 2, the electromotive force of about 0.6 V is generated at the room temperature or 20° C. and the electromotive force and the temperature are gradually increased. The electromotive force of about 0.9 V is generated at about 120° C. On the other hand, FIG. 3 shows the relationship between a short-circuit current and the temperature. As shown, the short-circuit current of the power generating element takes the value of several ten milli amperes at the room temperature or 20° C. The short-circuit current is increased to about 20 mA at 110° C. Thus, it is understood that a large short-circuit current can be obtained for the size of the power generating element and accordingly, it is confirmed that a low-temperature heat energy is efficiently converted to an electric energy.

Figure 4:
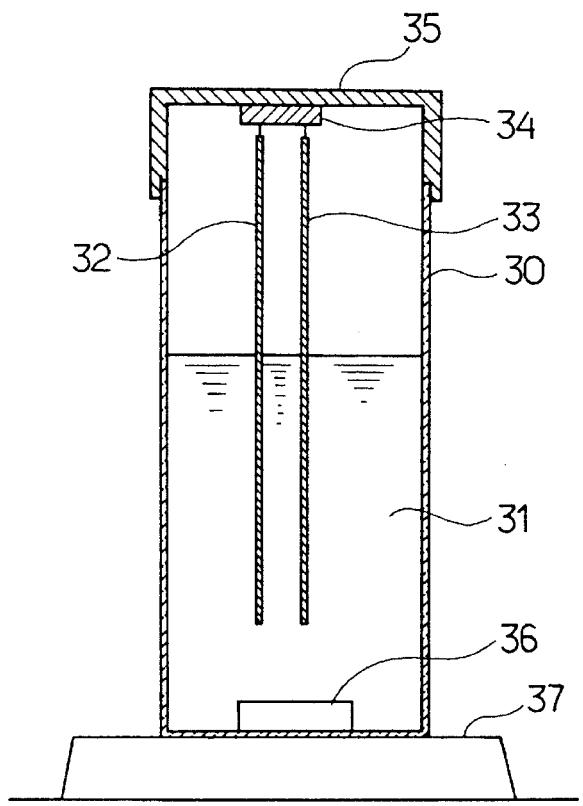
FIG. 4 is a longitudinally sectional front view of the liquid phase electric power generating element employed in the experiment.
Figure 5:
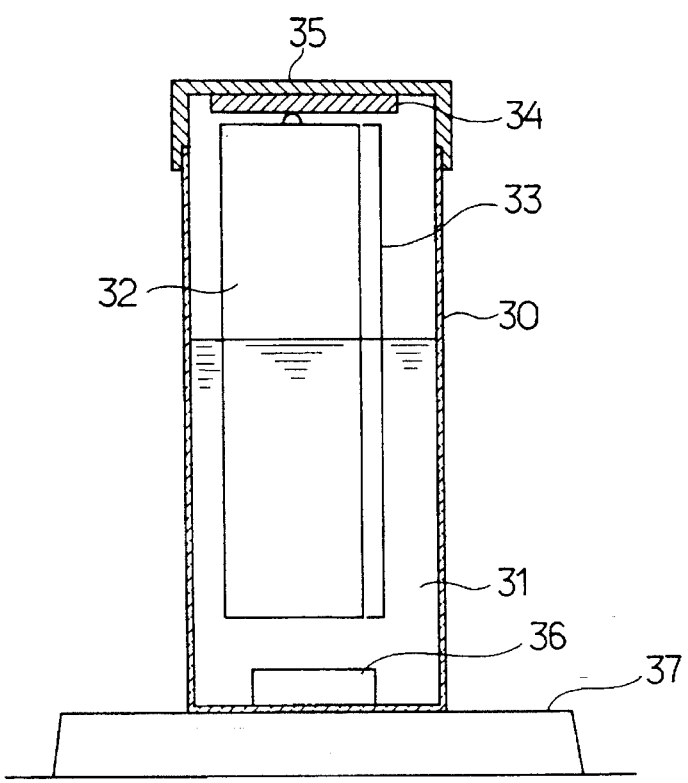
FIG. 5 is a longitudinally sectional side view of the liquid phase electric power generating element.

(2) The inventor made experiments with a liquid phase power generating element to explain the power generating mechanism of the element. The liquid phase power generating element comprises a heat-transferable vessel or sampling bottle 30 formed from lath, as shown in FIGS. 4 and 5. The sampling vessel 30 has the diameter of 35 mm and the height of 75 mm. A solution 31 of 40 gram of lithium chloride and polyethylene glycol is contained in the sampling vessel 30. A copper electrode 32 having the width of 20 mm, the length of 65 mm and the thickness of 1 mm and a graphite electrode 33 having the same size as the copper electrode 32 are fixed to a polycarbonate plate 34 with a gap of 5 mm between the electrodes. The electrodes 32, 33 are hung on a silicon rubber plug 35 in the sampling bottle 30. A part of each electrode immersed in the solution 31 has the length of 37 mm. An agitator 36 is placed on the bottom of the sampling bottle 30 and a platinum temperature sensor (not shown) insulated by a polyethylene tube is inserted in the sampling bottle 30 from its top. The sampling bottle 30 is then placed on a hot stirrer 37. The agitator 36 is rotated by a rotating magnetic field produced in the hot stirrer 37 so that agitated in the sampling bottle 30, the solution is heated at the rate of 0.45 deg/minute by the hot stirrer 37. Thus, the relationship between the short-circuit current and the temperature in the system of the lithium chloride having different density is measured.

Figure 6:
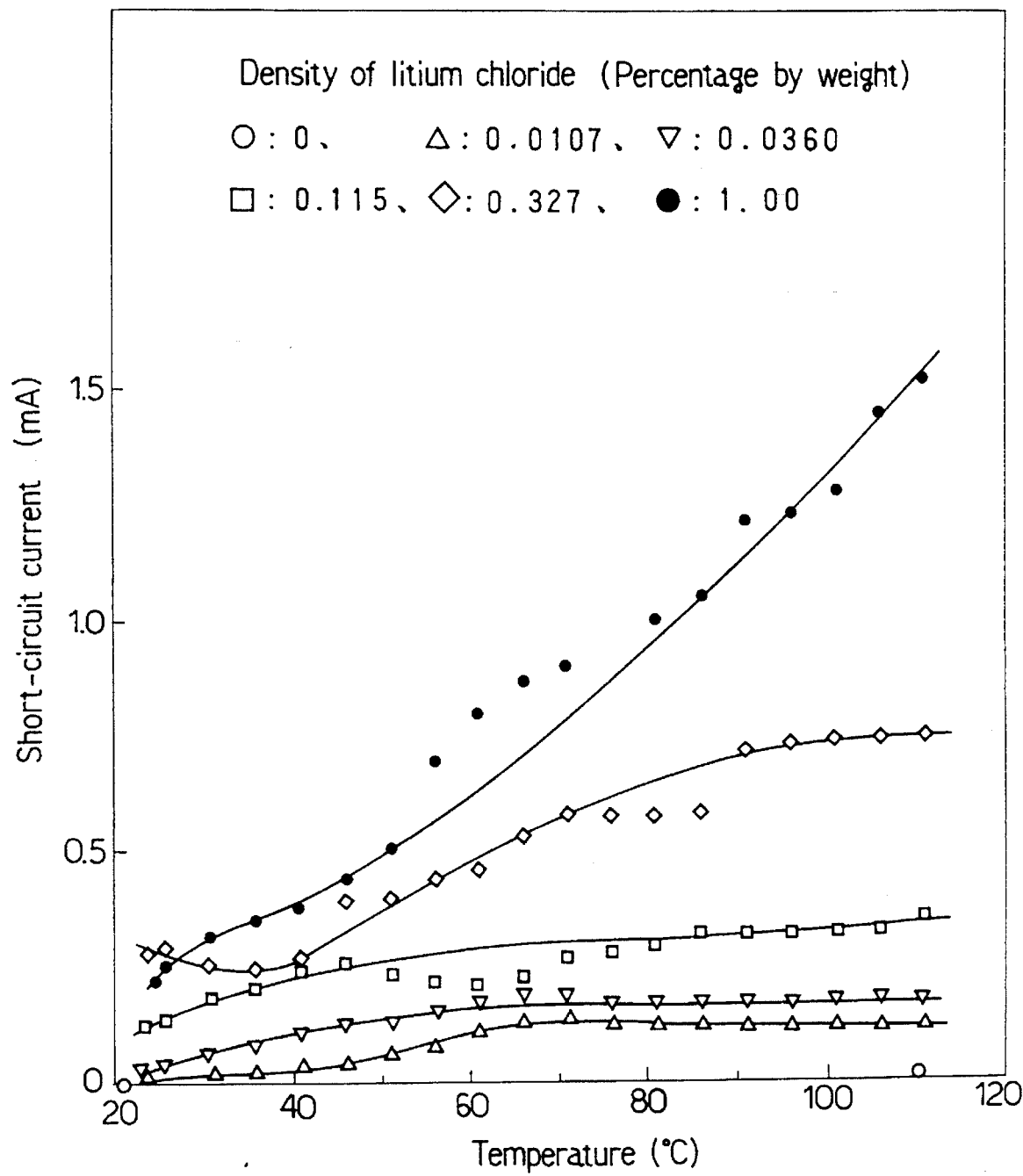
FIG. 6 is a graph showing the relationship between the short-circuit current and the temperature in the liquid phase electric power generating element comprising the system of lithium chloride-polyethylene glycol (#300), a positive electrode formed of a graphite plate and a negative electrode formed of a copper plate.

FIG. 6 shows the result of the above-described measurement. As obvious from FIG. 6, it is understood that the short-circuit current in the system of pure polyethylene glycol not containing lithium chloride is small though it is shown by only two circles. The relationship between the short-circuit current and the salt density is not so complicated and rather, it is understood that the short-circuit current depends upon the temperature and the salt density. The reason for this is supposed that the short-circuit current depends upon the electrode reaction and an inner resistance.

Figure 7:
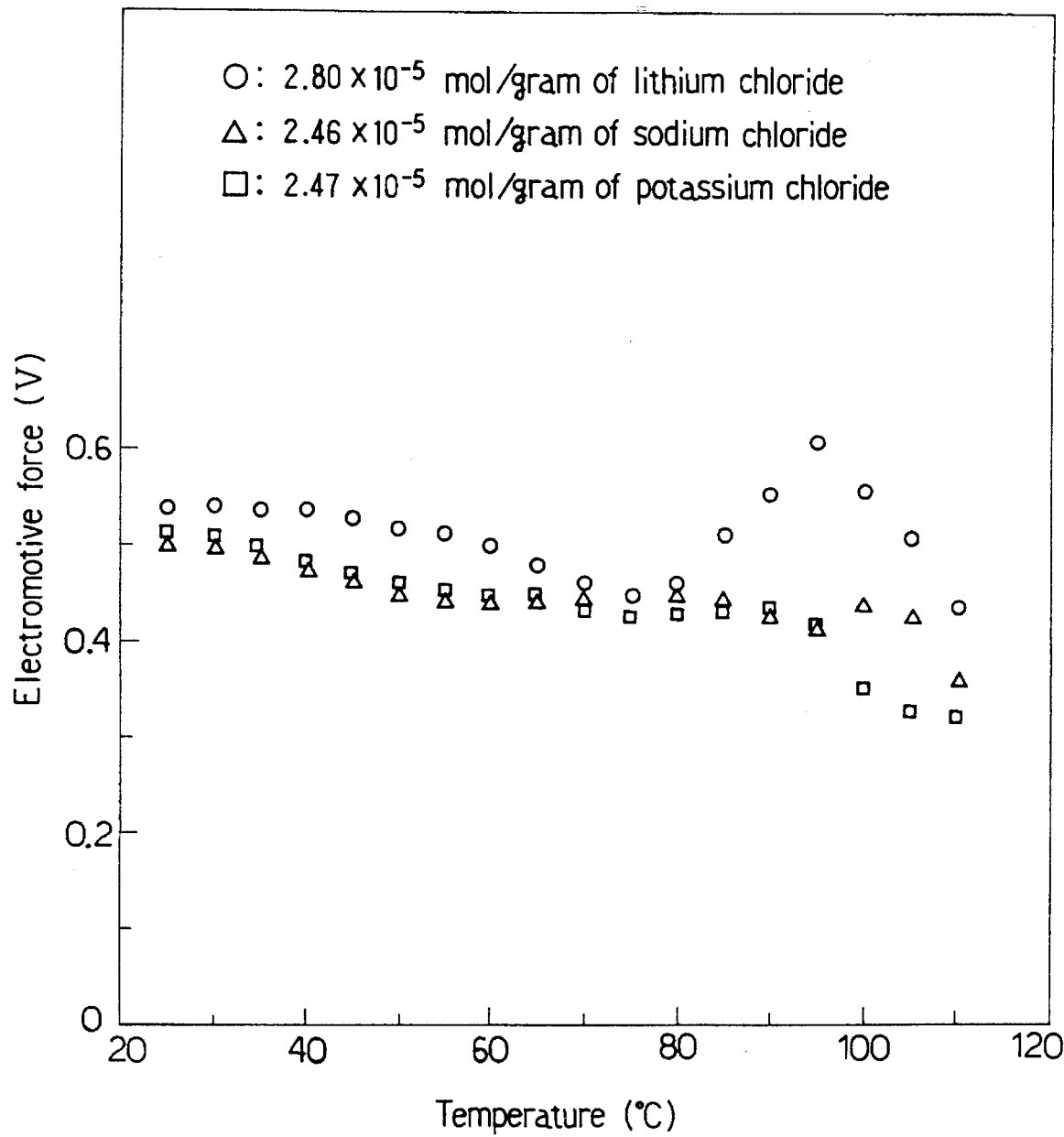
FIG. 7 is a graph showing the relationship between the electromotive forces and the temperatures in the liquid phase electric power generating elements wherein three systems of lithium chloride, sodium chloride and potassium chloride having approximately equal molar concentration are added to polyethylene glycol (#300) respectively and each of which having a positive electrode formed of a graphite plate and a negative electrode formed of a copper plate.
Figure 8:
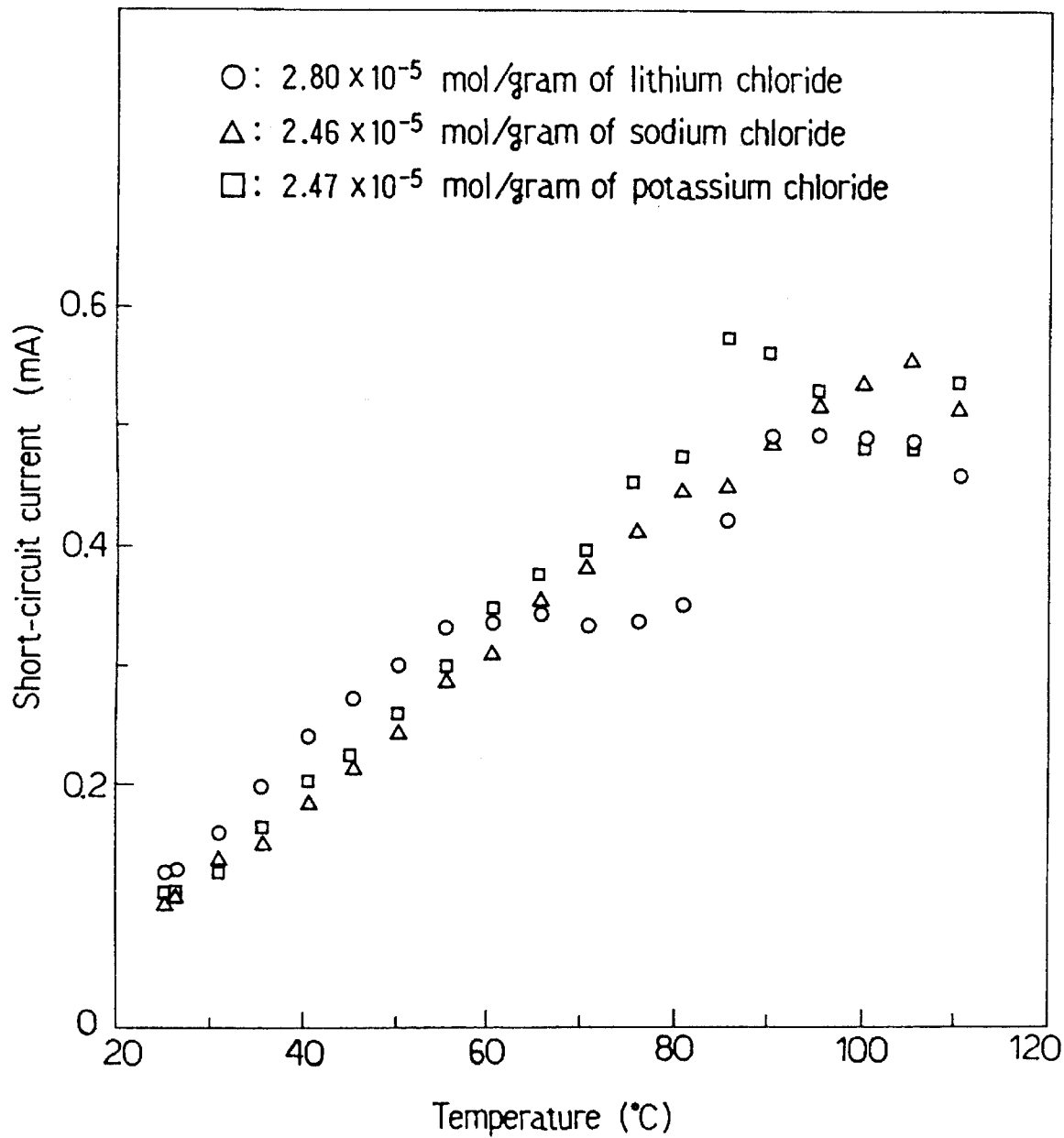
FIG. 8 is a graph showing the relationship between the short-circuit currents and the temperatures in the liquid phase electric power generating elements wherein three systems of lithium chloride, sodium chloride and potassium chloride having approximately equal molar concentration are added to polyethylene glycol (#300) respectively and each of which having a positive electrode formed of a graphite plate and a negative electrode formed of a copper plate.

(3) Influences of kinds of alkali chloride upon the element:

In the same manner as described above, the electromotive forces and the short-circuit currents at various temperatures are measured in the solutions of polyethylene glycol and each system of lithium chloride, sodium chloride and potassium chloride. FIGS. 7 and 8 show the results of the measurement. In this case, three kinds of salt take the approximately same mol density. FIGS. 7 and 8 show that there is almost no difference in the electromotive force and the short-circuit current among the three systems of salt. This means that a role of each kind of salt is to provide each system with electrical conductivity and that any kind of salt can be employed if a desirable mol density can be maintained.

(4) Relationship between the electromotive force and short-circuit current and the temperature in the electric power generating element of the present invention:

As obvious from FIGS. 6 and 8, the short-circuit current has the tendency to be increased with increase of the temperature. On the other hand, the electromotive force has the tendency to be decreased in the high temperature region, as obvious from FIG. 7. A more detailed study of the results shows that the electromotive force has the tendency to vary in the high temperature region and also when the density of lithium chloride is high. The reason for this is considered to be that an interference reaction which will be described later occurs both when the temperature is high and when the density of lithium chloride is high. This interference reaction in which the copper ions dissolve out from the negative electrode without the current flowing in the external circuit bears no relation to a discharge current flowing in the external circuit. In case that the interference reaction can be eliminated, there is a possibility that the electromotive force and the short-circuit current is sufficiently increased at the high temperature.

Figure 9:
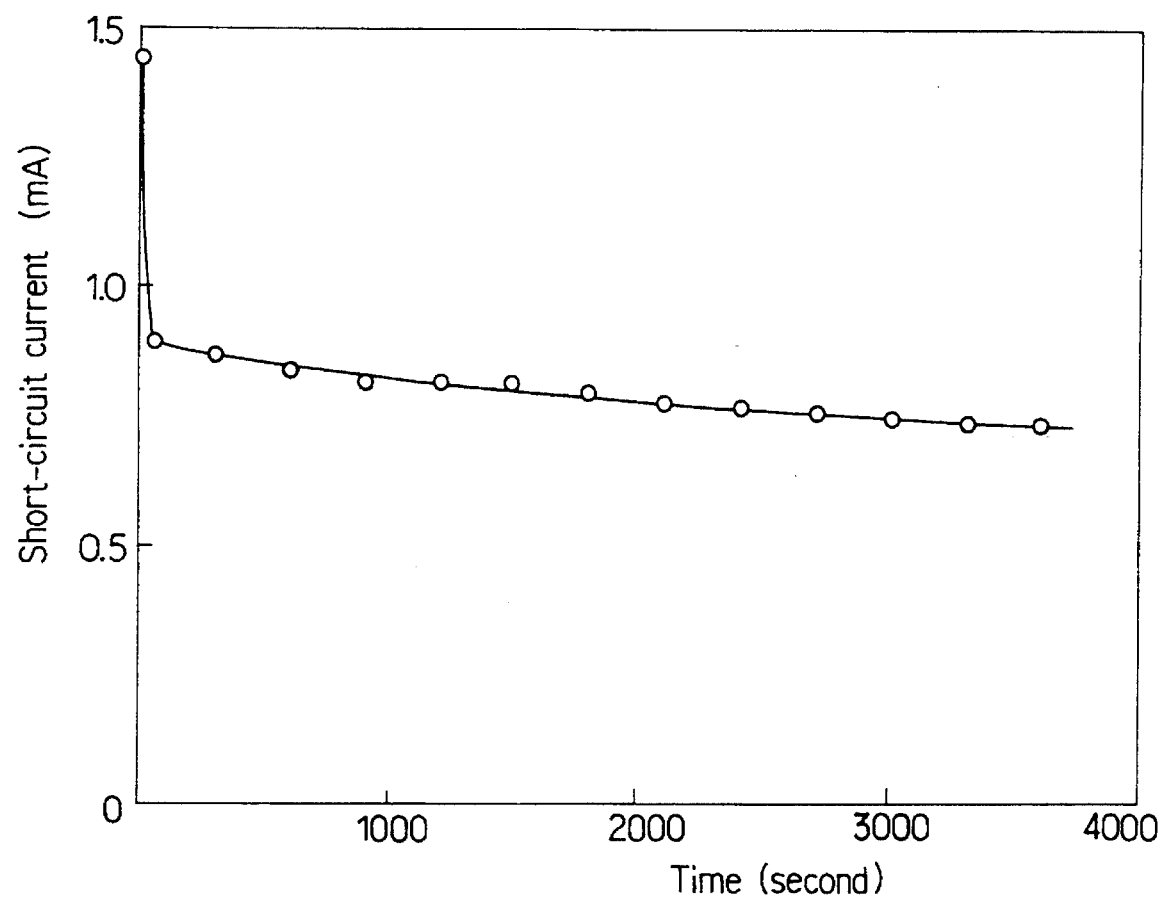
FIG. 9 is a graph showing the relationship between the short-circuit current and the elapsed time period in the liquid phase electric power generating element comprising the system of one weight percentage of lithium chloride-polyethylene glycol (#300), a positive electrode formed of a graphite plate and a negative electrode formed of a copper plate.

(5) Relation between the short-circuit current and the elapsed time period and further analysis of the system:

The current changes were measured in the same manner as described above in the case where the solution of 1 weight percentage of lithium chloride and polyethylene glycol were maintained at a predetermined temperature (111° C., for example) and a short-circuit current was caused to flow for a predetermined period of time. FIG. 9 shows the result of the measurement. As obvious from FIG. 9, the current is decreased to a large extent at an initial stage but subsequently, the degree of decrease becomes small. For example, the inductively coupled plasma emission spectrometry shows that the polyethylene glycol solution contains 510 ppm of copper after one hour discharge. On the other hand, an amount of copper contained in an unused solution of polyethylene glycol is below the analysis limit (>0.5 ppm). Accordingly, the value of dissolved copper obtained from FIG. 9 is 48 ppm when the dissolved copper is univalent and 24 ppm when the dissolved copper is bivalent.

No difference can be found between the spectrum of the polyethylene glycol solution after the discharge obtained by the infrared spectroscopic analysis and that of the unused polyethylene glycol solution. However, the ultraviolet spectrum of the polyethylene glycol solution after the discharge was measured by way of the spectrochemical analysis in ultraviolet and visible region and the result was compared with that of the unused polyethylene glycol solution. The sample of the polyethylene glycol after the discharge shows a new large peak of 366 nanometer in the shorter wavelength region and a new small peak of 426 nanometer in the longer wavelength region. Further study needs to be carried out as to whether these peaks relate to an electrochemical reaction or not, whether or not these peaks result from the thermal decomposition having no relation to the electrochemical reaction, and whether or not the dissolved copper ions result from absorption of products from polyethylene glycol.

Dissolved copper ions will now be described. The density of copper is 24 ppm as described above in case that the divalent copper dissolves out in the result of measurement shown in FIG. 9, but this value is only one twentieth of an actually measured value of 510 ppm. Consequently, it is considered that the mechanism that the copper ions dissolve out of the negative electrode (a kind of interruption reaction) is concurrent without the current flowing in the external circuit. This property may have some relation to reduction in the electromotive power with the increase in the density of lithium chloride as shown in FIG. 2. In case that the above-mentioned interruption reaction actually occurs, an improvement over the interruption reaction will provide an improvement of the performance of the electric power generating element.

Second Embodiment

Figure 10:
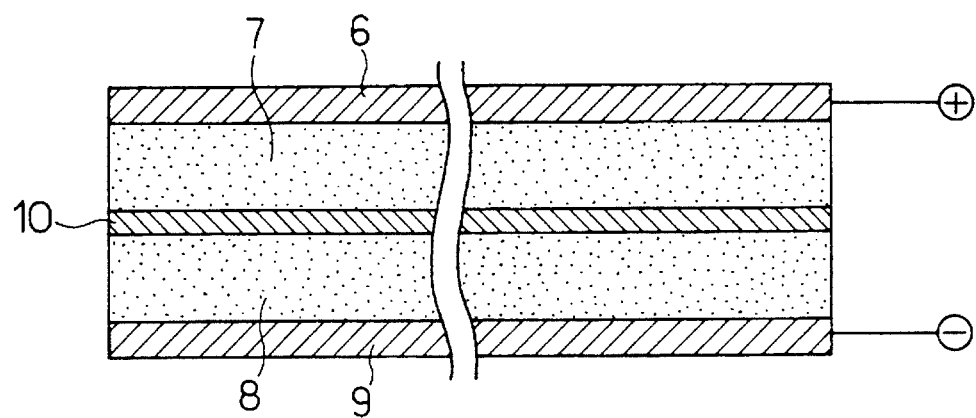
FIG. 10 is a sectional view of the electric power generating element of second through fifth embodiments of the invention.

The construction of the electric power generating element of a second embodiment will be described with reference to FIG. 10 which illustrates the construction common to second through fifth embodiments. The positive electrode 6 of the power generating element is formed of the copper foil. The positive-electrode composition 7 contains 10 weight percentage of manganese dioxide serving as an activator, 40 weight percentage of graphite ("#90—300M", Nishimura Graphite), and 50 weight percentage of polyethylene glycol.

The negative-electrode composition 8 contains 28 weight percentage of lithium chloride ("Special-grade Reagent", Nakaraitesuku), 12 weight percentage of zinc dust, and 60 weight percentage of polyethylene glycol. The negative electrode 9 is formed by rolling a small quantity of lithium with an agate mortar (not shown) in the atmosphere of nitrogen and pressing the rolled lithium on an aluminum foil. In this case, in consideration of a reaction of the negative-electrode composition 8 against liquid, it can be considered that only a part of the lithium employed in the negative electrode 9 serves as a metal.

The positive and negative compositions 7, 8 are heated to be melted in the same manner as in the first embodiment and two sheets of the nonwoven fabric of polyester resin are impregnated with the respective composition solutions. In this state, the compositions 7, 8 are secured to the respective electrodes 6, 9 with the separator 10 interposed therebetween.

Figure 11:
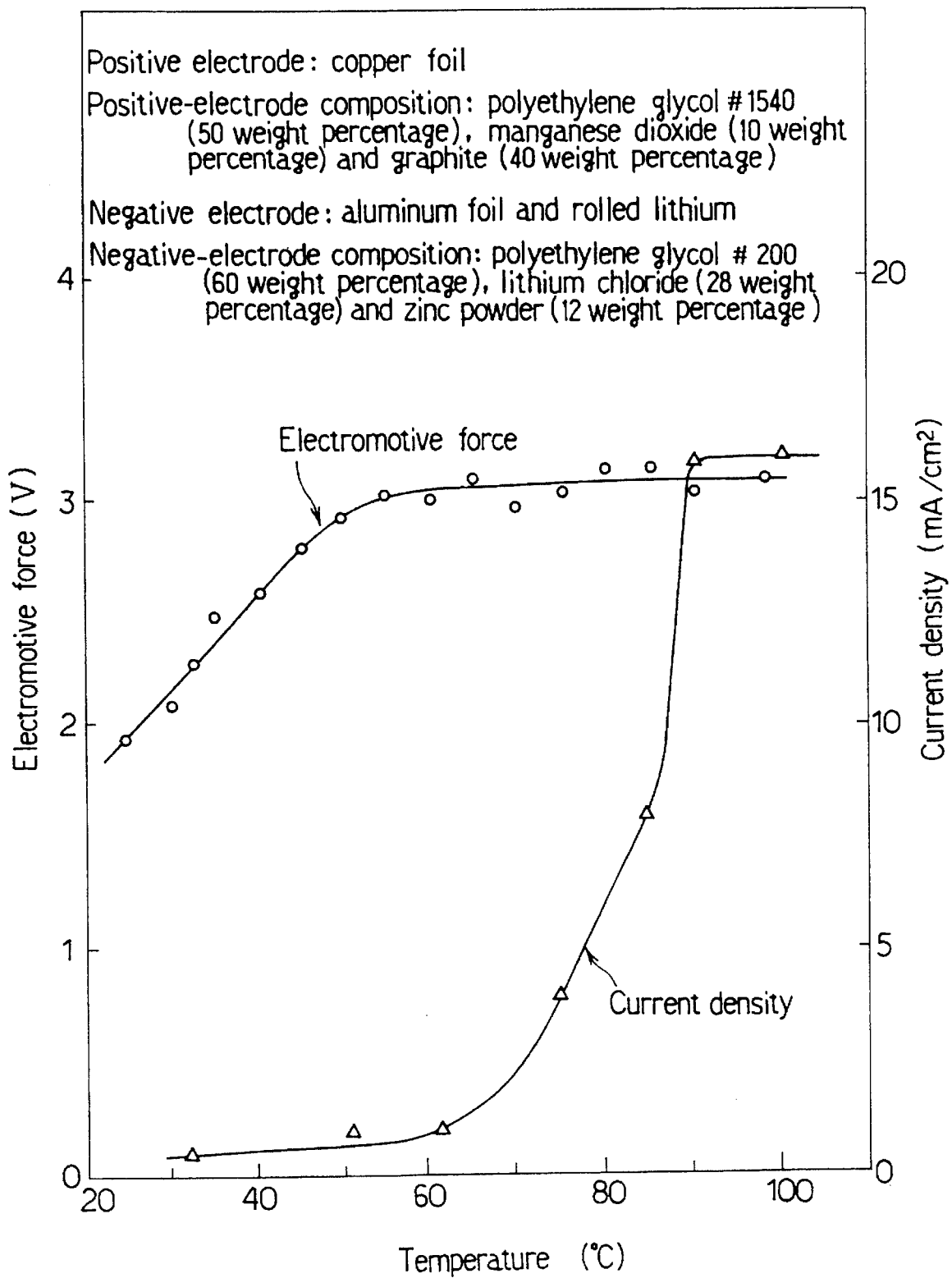
FIG. 11 is a graph showing the relationship between the electromotive force and the temperature in the element and the relationship between the short-circuit current density and the temperature in the element of the second embodiment.

FIG. 11 shows the relationships between the electromotive force and the short-current density and the temperature. As obvious from FIG. 11, the second embodiment obtains the electromotive force of 3.1 V and the short-circuit current of 16 mA/cm$^2$ both higher than those in the first embodiment. The reason is that the negative electrode 7 is formed from lithium having a high ionization tendency and aluminum.

Third Embodiment

In a third embodiment, the positive and negative electrodes 6, 9 are both formed from the copper foil in the same manner as in the first embodiment. The positive-electrode composition 7 contains 10 weight percentage of manganese dioxide (activator), 40 weight percentage of graphite ("#90—300M", Nishimura Graphite) and 50 weight percentage of polyethylene glycol. On the other hand, the negative-electrode composition 8 contains 28 weight percentage of lithium chloride ("Special-grade Reagent", Nakaraitesuku), 12 weight percentage of zinc powder and 60 weight percentage of polyethylene glycol. These positive-electrode and negative-electrode compositions 7, 8 are combined with each other with the separator 10 interposed therebetween.

Figure 12:
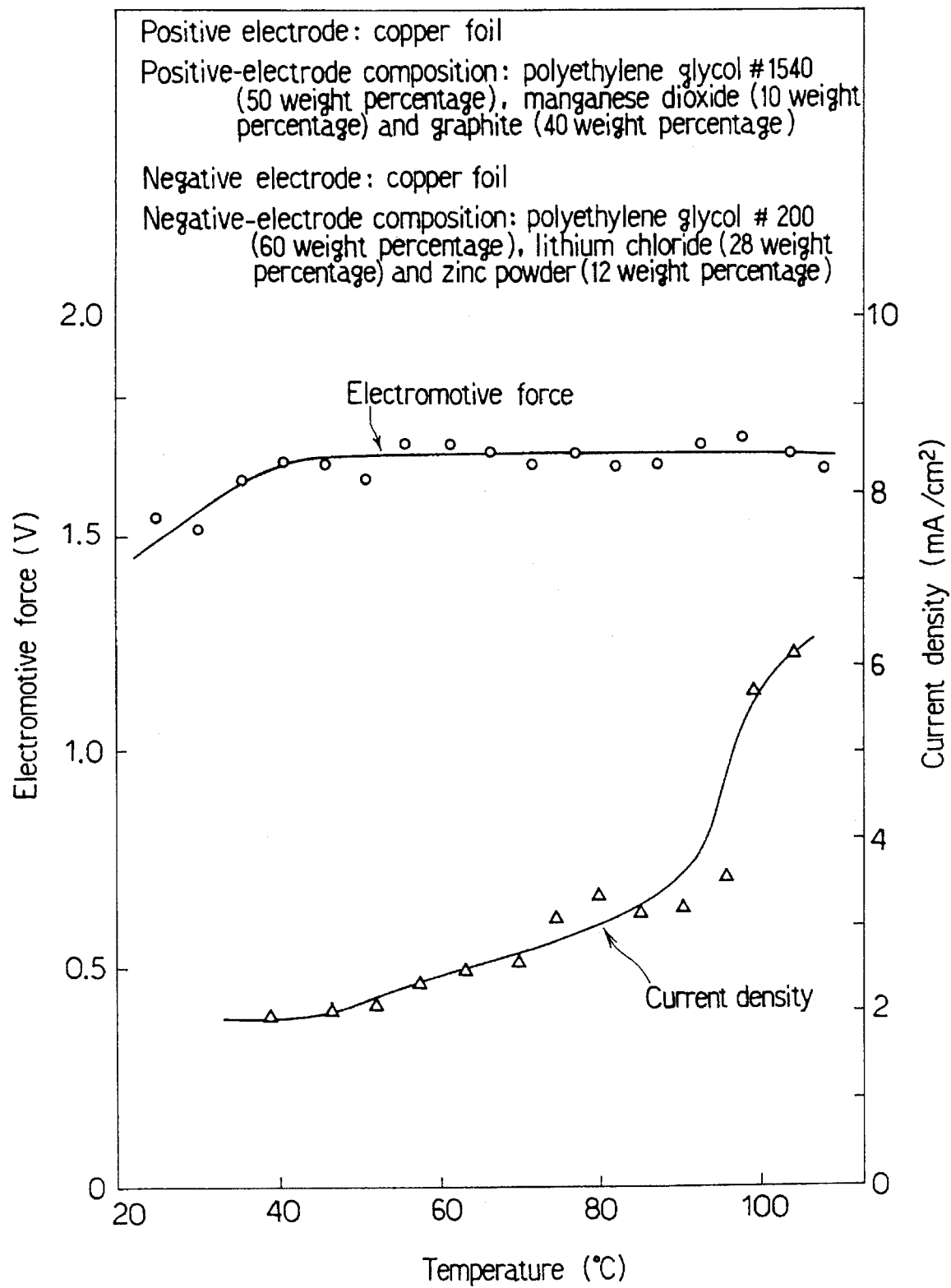
FIG. 12 is a graph showing the relationship between the electromotive force and the temperature in the element and the relationship between the short-circuit current density and the temperature in the element of the third embodiment.

FIG. 12 shows the relationships between the electromotive force and the short-current density and the temperature. As obvious from FIG. 12, the electromotive force and the short-circuit current in the third embodiment are lower than in the second embodiment but higher than in the first embodiment. The reason for this is that manganese dioxide serving as the reagent facilitates the electrode reaction.

Fourth Embodiment

In a fourth embodiment, the positive and negative electrodes 6, 9 are both formed from the copper foil in the same manner as in the first and third embodiments. The positive-electrode composition 7 contains 10 weight percentage of manganese dioxide (activator), 40 weight percentage of graphite ("#90—300M", Nishimura Graphite) and 50 weight percentage of polyethylene glycol. On the other hand, the negative-electrode composition 8 contains 28 weight percentage of lithium chloride ("Special-grade Reagent, Nakaraitesuku"), 12 weight percentage of magnesium powder and 60 weight percentage of polyethylene glycol. These positive-electrode and positive-electrode compositions 7, 8 are combined with each other in the same manner as in the second and third embodiments with the separator 10 interposed therebetween.

Figure 13:
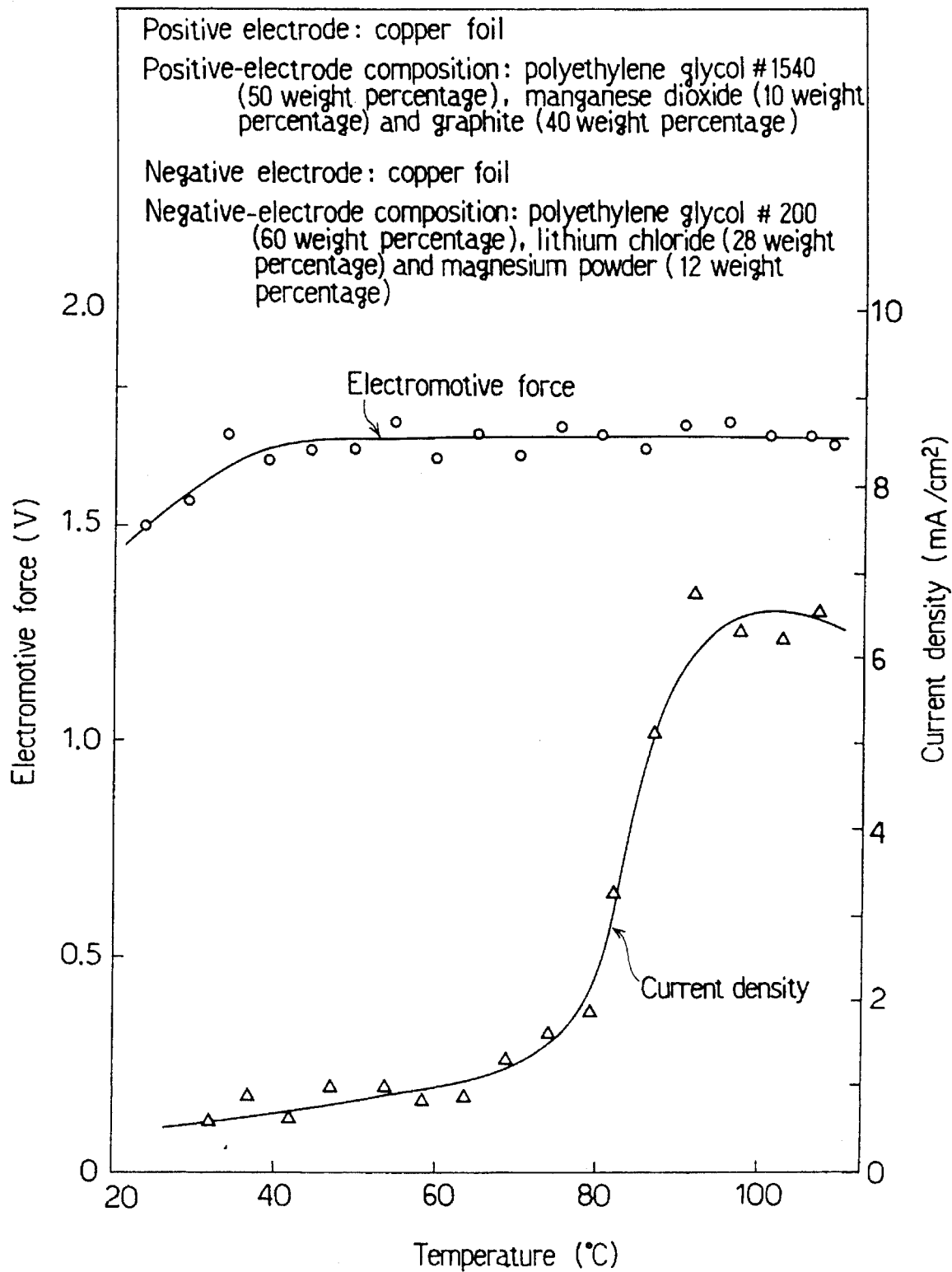
FIG. 13 is a graph showing the relationship between the electromotive force and the temperature in the element and the relationship between the short-circuit current density and the temperature in the element of the fourth embodiment.

FIG. 13 shows the relationships between the electromotive force and the short-current density and the temperature. As obvious from FIG. 13, the electromotive force and the short-circuit current in the fourth embodiment are lower than in the second embodiment but higher than in the first embodiment.

Fifth Embodiment

In a fifth embodiment, the positive and negative electrodes 6, 9 are both formed from the copper foil in the same manner as in the first, third and fourth embodiments. The positive-electrode composition 7 contains 10 weight percentage of manganese dioxide (activator), 40 weight percentage of graphite ("#90—300M", Nishimura Graphite) and 50 weight percentage of polyethylene glycol. On the other hand, the negative-electrode composition 8 contains 28 weight percentage of lithium chloride ("Special-grade Reagent, Nakaraitesuku)", 12 weight percentage of aluminum powder and 60 weight percentage of polyethylene glycol. These positive-electrode and positive-electrode compositions 7, 8 are combined with each other in the same manner as in the second, third and fourth embodiments with the separator 10 interposed therebetween.

Figure 14:
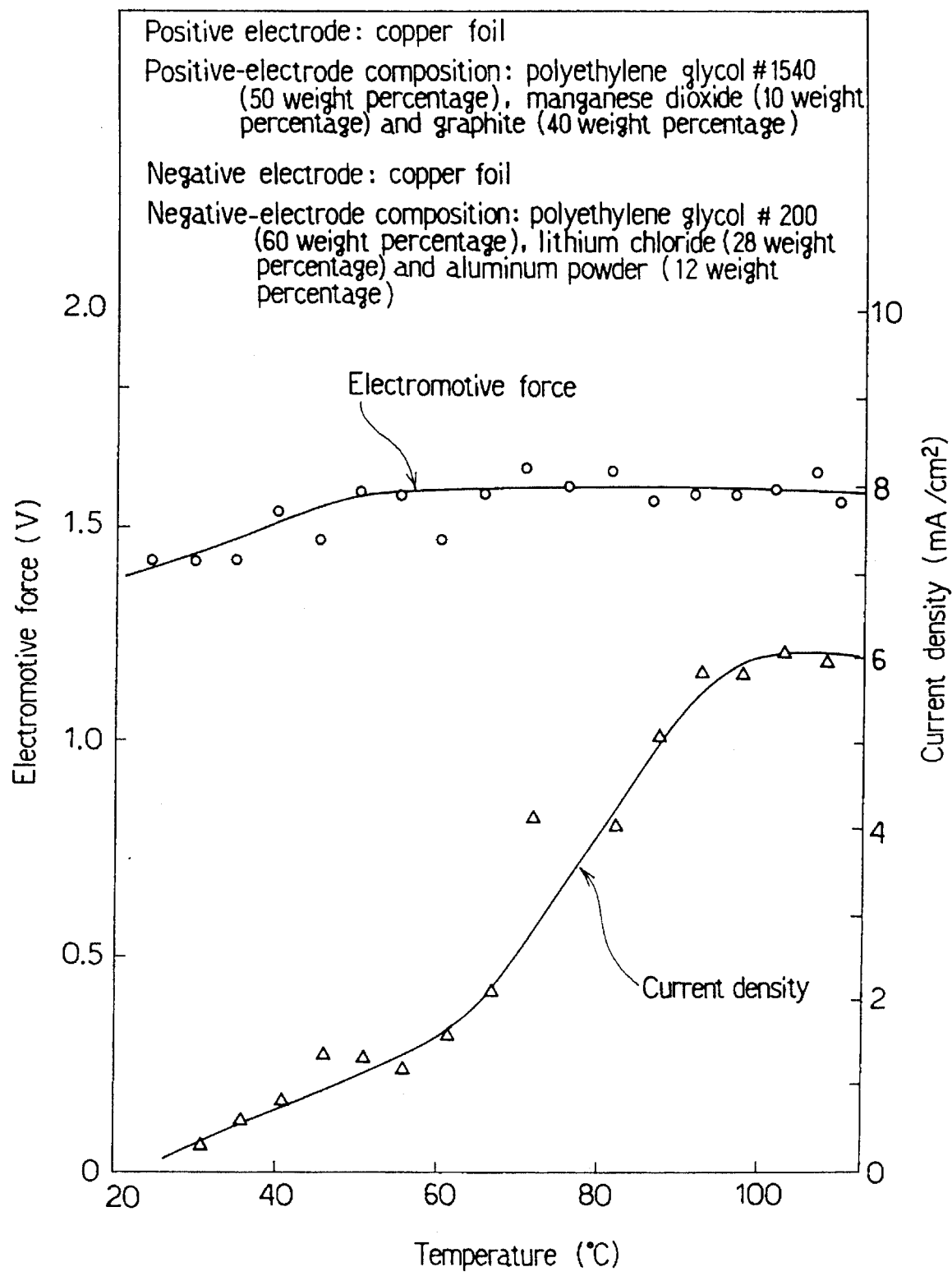
FIG. 14 is a graph showing the relationship between the electromotive force and the temperature in the element and the relationship between the short-circuit current density and the temperature in the element of the fifth embodiment.

FIG. 14 shows the relationships between the electromotive force and the short-circuit current density and the temperature. As obvious from FIG. 13, the electromotive force and the short-circuit current in the fifth embodiment are lower than in the second embodiment but higher than in the first embodiment.

Sixth Embodiment

Figure 15:
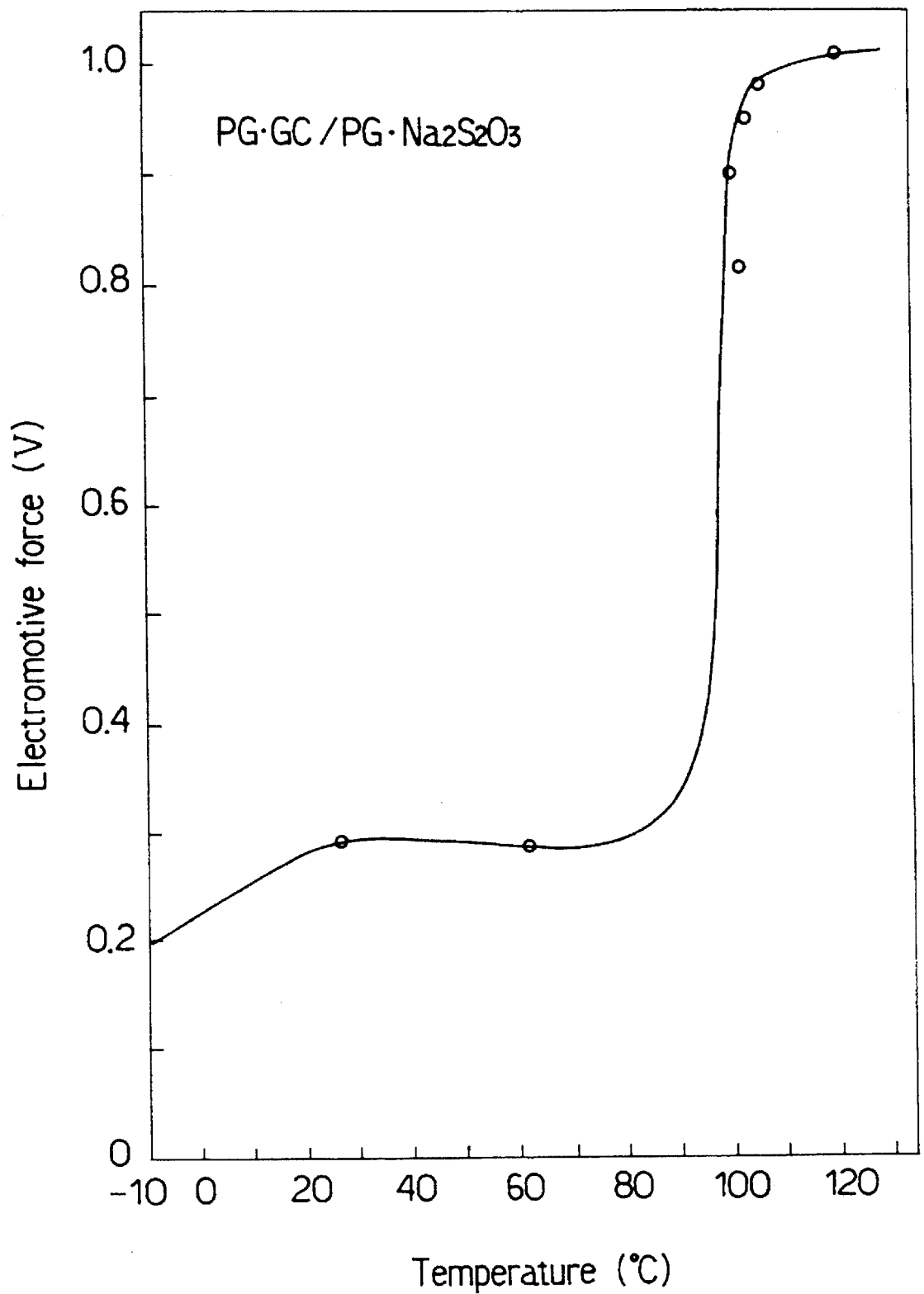
FIG. 15 is a graph showing the relationship between the electromotive force and the temperature in the element of the sixth embodiment.
Figure 16:
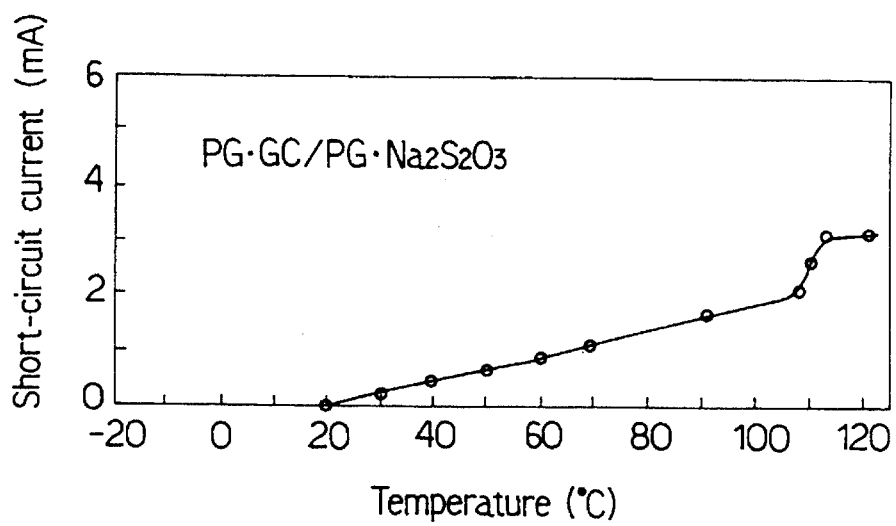
FIG. 16 is a graph showing the relationship between the short-circuit current between the electrodes and the temperature in the sixth embodiment.

The negative composition 8 contains sodium thiosulfate ($Na_2S_2O_3$) instead of lithium chloride. Sodium thiosulfate provides polyethylene glycol with the ionic conductivity. the other composition is the same as that in the first embodiment. FIG. 15 shows the relationship between the electromotive force and the temperature and FIG. 16 shows the relationship between the short-circuit current and the temperature in the sixth embodiment. Sodium thiosulfate is a reducing agent but an oxidizing agent is not present at the positive electrode side, so that a general battery is not constructed in the sixth embodiment. In this embodiment, the increase in the electromotive force with increase of the temperature is small up to 80° C. but becomes steep approximately at 90° C.

Figure 17:
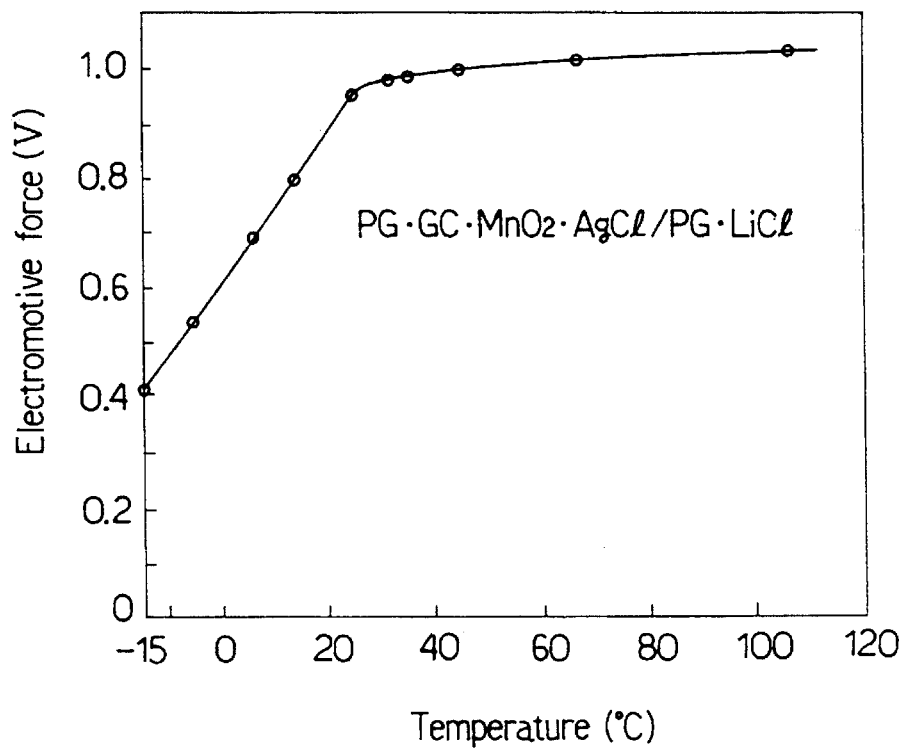
FIG. 17 is a graph showing the relationship between the electromotive force and the temperature in the element of the seventh embodiment.
Figure 18:
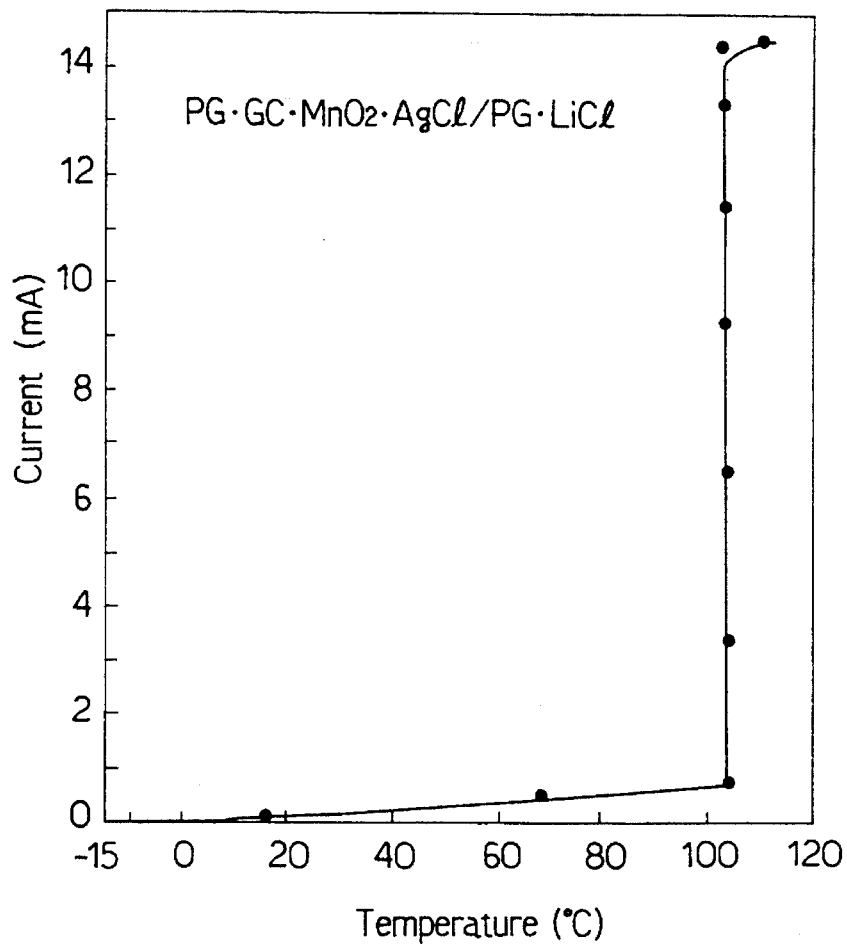
FIG. 18 is a graph showing the relationship between the short-circuit current between the electrodes and the temperature in the seventh embodiment.
Figure 19:
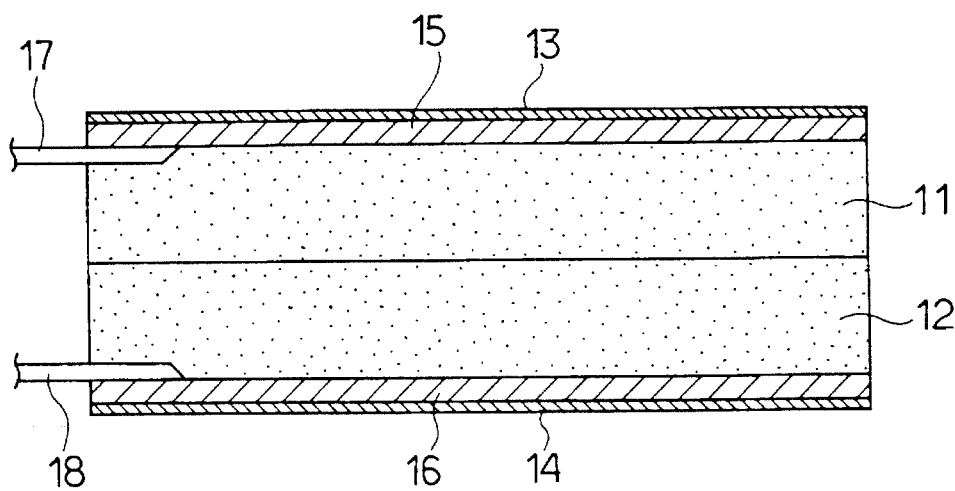
FIG. 19 is a sectional view of the electric power generating element of the eighth embodiment.

Seventh Embodiment:

The positive-electrode composition 7 contains 10 weight percentage of manganese dioxide ($MnO_2$) and 10 weight percentage of silver chloride (AgCl) as the activators. The other composition of the electric power generating element is the same as that in the first embodiment. FIG. 17 shows the relationship between the electromotive force and the temperature and FIG. 18 shows the relationship between the short-circuit current and the temperature in the seventh embodiment. The electromotive force takes an approximately fixed value of 1 V in the range of 20° C. or above while the short-circuit current is steeply increased at about 100° C.

Eighth Embodiment

In an eighth embodiment, the positive-electrode composition 11 is formed by melting 70 weight percentage of polyethylene glycol (Daiichi Kogyo Seiyaku Co., Ltd.) by way of heating and mixing the melted polyethylene glycol with 30 weight percentage of graphite (flake graphite or "#90—300M", Nishimura Graphite) with graphite being agitated. The negative-electrode composition 12 is formed by melting 70 weight percentage of paraffin wax ("Microcrystalline wax Hi-Mic-2095", Nippon Seirousha) and mixing the melted paraffin wax with 30 weight percentage of graphite (flake graphite or "#90—300M", Nishimura Graphite) with the graphite being agitated.

Figure 20:
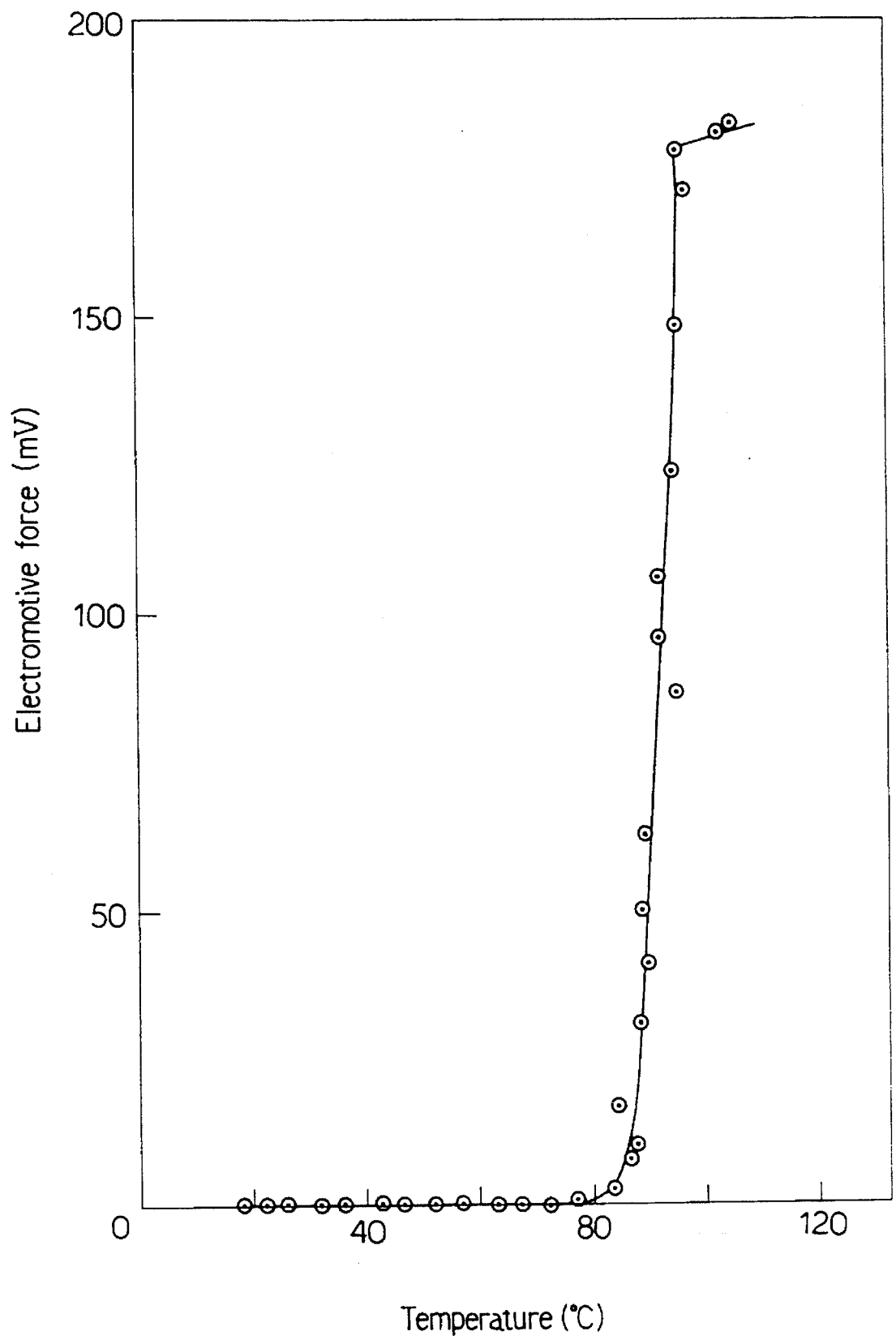
FIG. 20 is a graph showing the relationship between the electromotive force and the temperature in the element of the eighth embodiment.

The electric power generating element of the eighth embodiment has envelopes 13 and 14 formed from 50 μm of polyester film. Copper electrodes 15 and 16 are bonded to the envelopes 13, 14 respectively. The melted positive-electrode and negative-electrode compositions 11 and 12 are poured onto the copper electrodes 15, 16 respectively to be hardened. Subsequently, the positive-electrode and negative-electrode compositions 11, 12 are superposed upon each other. Lead wires 17 and 18 are soldered to the electrodes 15, 16 respectively. FIG. 20 shows the electromotive force obtained from the above-described electric power generating element.

In accordance with the present invention, the low-temperature thermal energy can be efficiently converted to the electric energy as compared with the thermoelectric power generating element by use of the Seebeck effect. Differing from the solar battery, the electric power generating element of this invention can provide the electric power when and where light is not available. Consequently, the low-temperature thermal energy such as the exhaust heat, solar energy, ground heat or spa heat can be efficiently employed as the heat source. Thus, the present invention provides an economic power generation from which a sufficient energy saving can be achieved and which can also contributes to the global environment protection. Furthermore, the raw material cost is low in the electric power generating element of the invention. Consequently, the electric power generating element of the present invention provides a large cost reduction as compared with the thermoelectric power generating element or the solar battery. Additionally, the electric power generating element of the invention provides a high-level safety for the human bodies as compared with the conventional chemical battery since the compositions employed in the element of the present invention are organic compounds non-noxious to the human bodies.

For the purpose of further increasing the energy converting efficiency, first, an activating agent may be added to the positive-electrode composition so that the electrode reaction is facilitated for increase in the electromotive force. Second, the negative electrode may be formed from a metal having a high ionization tendency for increase in the electromotive force. Third, the nonwoven fabric may be impregnated with each of the electrode compositions so that the thickness of the electric power generating element is reduced for reduction in the internal resistance with the result of increase in the short-circuit current.

In the foregoing embodiments, the class of salt providing the positive-electrode or negative-electrode composition with the ionic conductivity is not limited to the metallic halogenide (LiCl or NaCl). Instead, the metallic halogenide may be replaced with the inorganic acid metallic salts such as $Na_2SO_4$, $K_3PO_4$ or $NaNO_3$, perchloric acid metallic salts such as $LiClO_4$ or $NaClO_4$, the class of organic acid salts such as oxalate, formate or carboxylic acid salt.

The positive-electrode composition may contain carbon black instead of graphite. Furthermore, instead of the craft paper, the separator may comprise parchment paper or various types of ionic conductive films. When each of these separators is interposed between the positive and negative electrodes, the electrodes can be prevented from being brought into contact with each other even if the electric power generating element is thinned. However, means other than the separator may be employed for preventing the electrodes from being brought into contact with each other.

Furthermore, the nonwoven fabric impregnated with the positive-electrode and negative-electrode compositions should not be limited to the above-described one formed from the polyester resin. It may be replaced with any one of other polyester resins, for example polypropylene fiber, which prevents the composition solution from permeating to the fiber inside. In the case of nonwoven fabric formed from natural fiber which allows the composition solution to permeate to the fiber inside, polyethylene glycol and the carbon particles do not permeate at the same rate and consequently, the density of the components of the composition becomes nonuniform.

Although polyethylene glycol is employed as a main material of each of the positive-electrode and negative-electrode compositions in the foregoing embodiments, polyethylene glycol may be contained in either composition. However, the positive-electrode composition needs to contain graphite or graphite composition.

Although copper is employed as a metal composing the negative electrode in the foregoing embodiments, a metal having the ionization tendency as large as or larger than copper or its composition may be employed instead.

The foregoing disclosure and drawings are merely illustrative of the principles of the present invention and are not to be interpreted in a limiting sense. The only limitation is to be determined from the scope of the appended claims.

I claim:

1. An electric power generating element converting heat energy to an electric energy, comprising:
    a) a positive electrode;
    b) a negative electrode formed from a metal;
    c) a positive electrode composition provided on the surface of the positive electrode and comprising polyethylene glycol and graphite particles dispersed in the polyethylene glycol; and
    d) a negative electrode composition provided at a side of the negative electrode and comprising polyethylene glycol containing a salt providing an ionic conductivity.

2. An electric power generating element according to claim 1, which further comprises fluid permeable cores impregnated with the positive electrode and negative electrode compositions respectively, each core being formed of a nonwoven fabric.

3. An electric power generating element according to claim 1, which further comprises a separator interposed between the positive electrode and negative electrode compositions.

4. An electric power generating element according to claim 1, wherein the positive electrode composition contains an activator which is manganese dioxide.

5. An electric power generating element according to claim 1, wherein the metal including within its composition a metal having an ionization tendency as large as or larger than copper.

6. An electric power generating element according to claim 1, wherein the negative electrode composition contains a metal powder.

7. An electric power generating element converting a heat energy to an electric energy, comprising:
    a) a positive electrode formed from graphite;
    b) a negative electrode formed from a metal;
    c) a solution of polyethylene glycol immersing both positive and negative electrodes;
    d) a salt contained in the solution of polyethylene glycol for providing the same with an ionic conductivity;
    e) a heat-transferable vessel filled with the solution of polyethylene glycol and transferring an external heat to the solution of polyethylene glycol;
    f) a silicone rubber plug insertable into the top of said heat transferable vessel; and
    g) a polycarbonate plate attached to said silicone rubber plug for suspending said immersed electrodes.

* * * * *